US012620239B2

(12) United States Patent
Lee et al.

(10) Patent No.: US 12,620,239 B2
(45) Date of Patent: May 5, 2026

(54) DRIVING ASSISTANCE ALGORITHM TESTING METHOD, ELECTRONIC DEVICE AND STORAGE MEDIUM

(71) Applicant: HON HAI PRECISION INDUSTRY CO., LTD., New Taipei (TW)

(72) Inventors: Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 484 days.

(21) Appl. No.: 18/195,340

(22) Filed: May 9, 2023

(65) Prior Publication Data

US 2024/0233396 A1 Jul. 11, 2024

(30) Foreign Application Priority Data

Jan. 6, 2023 (CN) .......................... 202310020604.1

(51) Int. Cl.
*G06V 20/58* (2022.01)
*B60W 40/12* (2012.01)

(52) U.S. Cl.
CPC ............. *G06V 20/58* (2022.01); *B60W 40/12* (2013.01); *B60W 2420/403* (2013.01); *B60W 2510/20* (2013.01)

(58) Field of Classification Search
None
See application file for complete search history.

(56) References Cited

FOREIGN PATENT DOCUMENTS

| CN | 113848855 | 12/2021 |
| CN | 115113542 | 9/2022 |

OTHER PUBLICATIONS

Translation for CN 113848855 (Year: 2021).*

* cited by examiner

*Primary Examiner* — Lennin R Rodriguezgonzalez
(74) *Attorney, Agent, or Firm* — ScienBiziP, P.C.

(57) ABSTRACT

A driving assistance algorithm testing method applied to an electronic device is provided. In the method, the electronic device obtains a driving assistance algorithm to be tested of a vehicle and multiple specification parameters and models a virtual scene on a simulator according to the preset parameters and generates an initial image according to the virtual scene. The electronic device obtains a target image corresponding to the driving assistance algorithm by converting the initial image according to a preset sensor conversion algorithm and the specification parameters, and generates a target vehicle control instruction according to the driving assistance algorithm, the target image, a vehicle control conversion algorithm, and the specification parameters, and scores the driving assistance algorithm by executing the target vehicle control instruction in the virtual scene of the simulator. The method can improve a verification accuracy of the driving assistance algorithm.

17 Claims, 3 Drawing Sheets

Obtain a driving assistance algorithm of a vehicle to be tested and at least one specification parameter /S11

Model a virtual scene on a simulator according to multiple preset parameters and generate initial data according to the virtual scene /S12

Obtain target data corresponding to the driving assistance algorithm to be tested by converting the initial data according to a preset sensor conversion algorithm and the at least one specification parameter /S13

Generate a target vehicle control instruction corresponding to the driving assistance algorithm to be tested of the simulator according to the driving assistance algorithm to be tested, the target data, a vehicle control conversion algorithm, and the at least one specification parameter /S14

Score the driving assistance algorithm to be tested by executing the target vehicle control instruction in the virtual scene of the simulator /S15

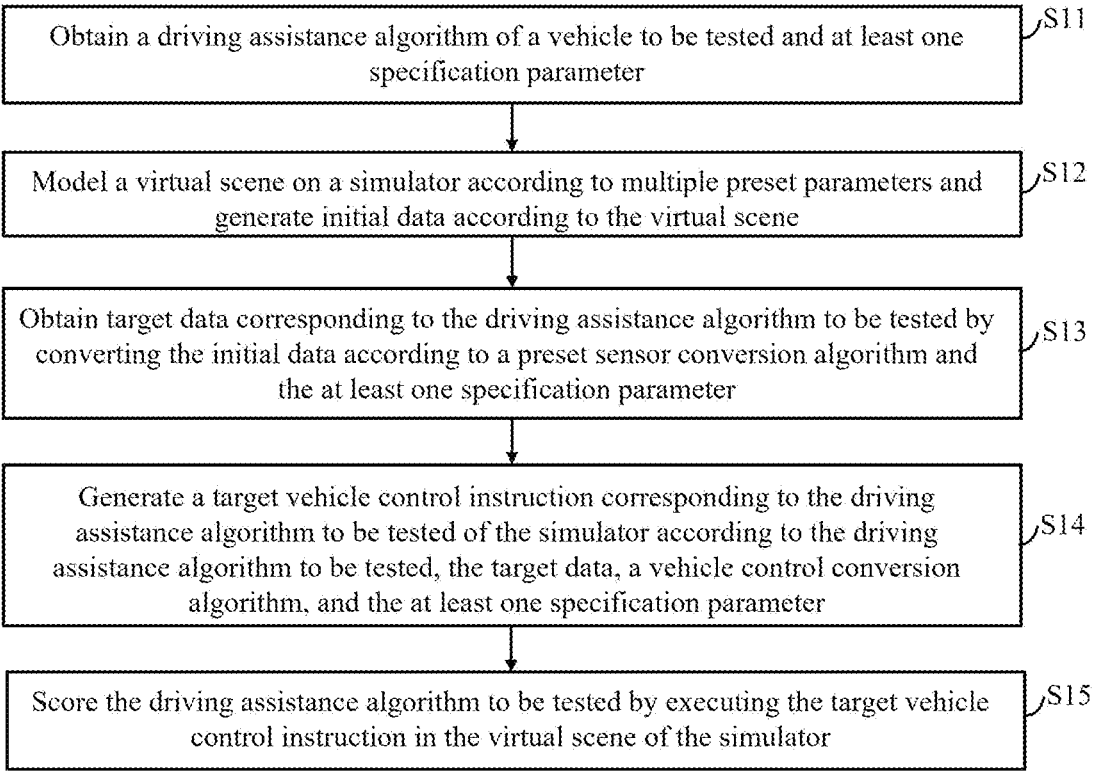

Obtain a driving assistance algorithm of a vehicle to be tested and at least one specification parameter ⌐S11

Model a virtual scene on a simulator according to multiple preset parameters and generate initial data according to the virtual scene ⌐S12

Obtain target data corresponding to the driving assistance algorithm to be tested by converting the initial data according to a preset sensor conversion algorithm and the at least one specification parameter ⌐S13

Generate a target vehicle control instruction corresponding to the driving assistance algorithm to be tested of the simulator according to the driving assistance algorithm to be tested, the target data, a vehicle control conversion algorithm, and the at least one specification parameter ⌐S14

Score the driving assistance algorithm to be tested by executing the target vehicle control instruction in the virtual scene of the simulator ⌐S15

FIG. 1

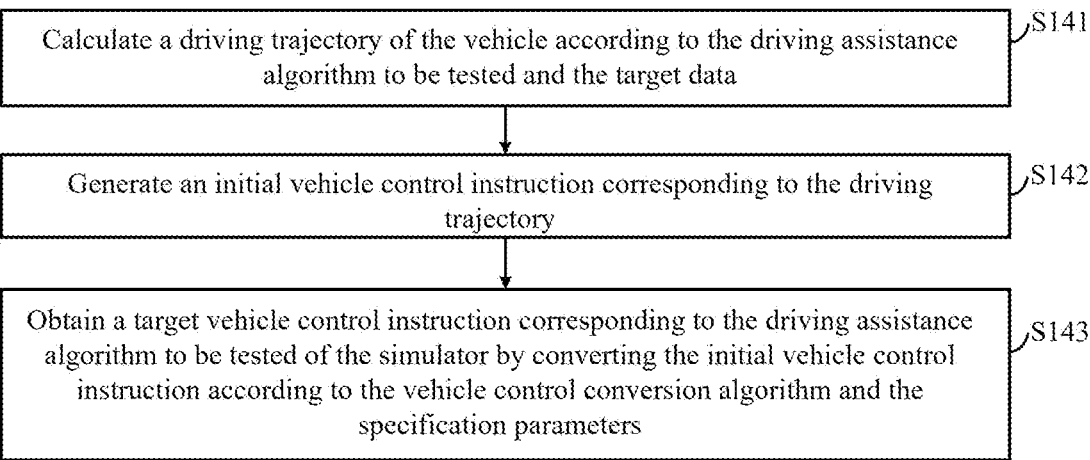

Calculate a driving trajectory of the vehicle according to the driving assistance algorithm to be tested and the target data ⌐S141

Generate an initial vehicle control instruction corresponding to the driving trajectory ⌐S142

Obtain a target vehicle control instruction corresponding to the driving assistance algorithm to be tested of the simulator by converting the initial vehicle control instruction according to the vehicle control conversion algorithm and the specification parameters ⌐S143

FIG.2

DRIVING ASSISTANCE ALGORITHM TESTING METHOD, ELECTRONIC DEVICE AND STORAGE MEDIUM

FIELD

The present disclosure relates to a field of vehicle control, in particular to a driving assistance algorithm testing method, an electronic device, and a storage medium.

BACKGROUND

In a current verification scheme that a simulator is used to test a driving assistance algorithm, there is an error between each execution instruction of a simulator of a vehicle and each vehicle control instruction calculated by the driving assistance algorithm. If the simulator directly executes the instructions calculated by the driving assistance algorithm, it will cause a virtual vehicle of the simulator cannot achieve the vehicle control effect corresponding to execute the vehicle control instruction, resulting in inaccurate verification results by using the driving assistance algorithm of the simulator. In addition, if an unqualified driving assistance algorithm is installed in the vehicle, it may affect driving safety. Therefore, how to improve the verification accuracy of the driving assistance algorithm has become a technical problem that needs to be solved urgently.

BRIEF DESCRIPTION OF THE DRAWINGS

FIG. 1 is a flowchart of a driving assistance algorithm testing method provided by an embodiment of the present disclosure.

FIG. 2 is a flowchart of a method for generating a target vehicle control instruction provided by an embodiment of the present disclosure.

DETAILED DESCRIPTION

Figure 3:
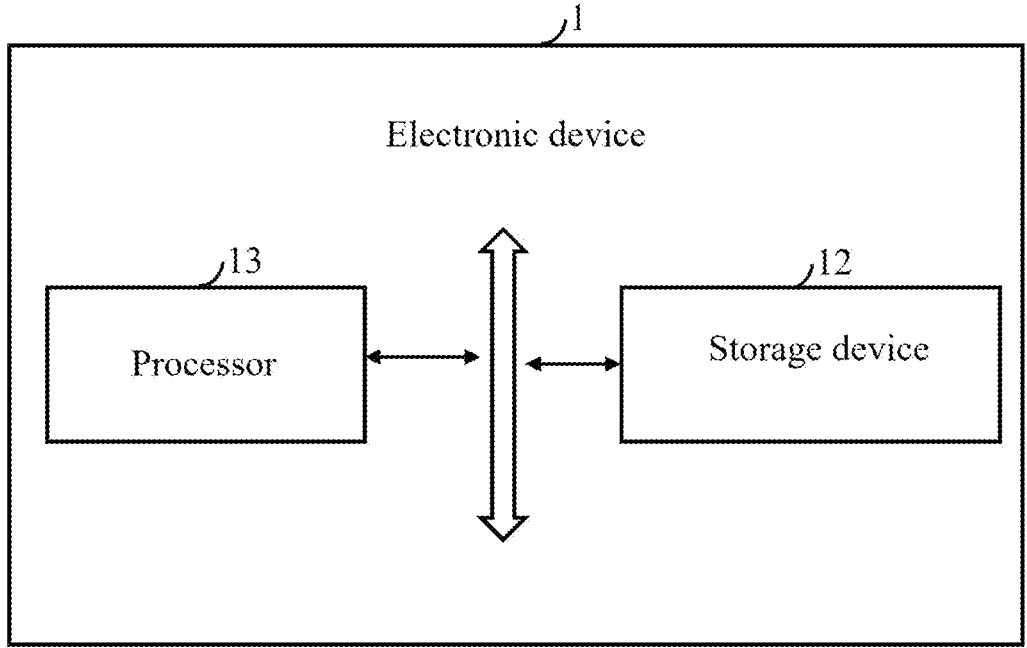
FIG. 3 is a schematic structural diagram of an electronic device provided by an embodiment of the present disclosure.

Plurality of embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have their common meanings as construed by those of ordinary skills in the art to which the present disclosure pertains. The terms "first", "second" and the like used in the embodiments of the present disclosure do not represent any order, quantity, or importance, but are merely used to distinguish between different components. The terms "include", "contain" or the like mean that elements or articles appearing before such terms may cover elements or articles listed after the words and their equivalents without excluding other elements or articles. The terms "connect", "link" or the like are not limited to physical or mechanical connection, but may include electrical connections, whether direct or indirect.

In a current verification scheme that a simulator is used to test a driving assistance algorithm, there is an error between each execution instruction of a simulator of a vehicle and each vehicle control instruction calculated by the driving assistance algorithm. If the simulator directly executes the instructions calculated by the driving assistance algorithm, it will cause a virtual vehicle of the simulator cannot achieve the vehicle control effect corresponding to execute the vehicle control instruction, resulting in inaccurate verification results by using the driving assistance algorithm of the simulator. In addition, if an unqualified driving assistance algorithm is installed in the vehicle, it may affect driving safety. Therefore, how to improve the verification accuracy of the driving assistance algorithm has become a technical problem that needs to be solved urgently.

In order to solve the above problems, an embodiment of the present disclosure provides a method for testing a driving assistance algorithm, which can improve the verification accuracy of the driving assistance algorithm, thereby improving driving safety. The following will be described in detail in conjunction with the corresponding drawings.

FIG. 1 is a flowchart of a driving assistance algorithm testing method provided by an embodiment of the present disclosure. In one embodiment, the method can be performed by using one or more electronic device (e.g., the electronic device 1 shown in FIG. 3). The electronic device can automatically perform parameter value calculation and/or information processing according to pre-set or stored instructions. The electronic device includes, but is not limited to, a microprocessor, an application specific integrated circuit (Application Specific Integrated Circuit, ASIC), a programmable gate array (Field-Programmable Gate Array, FPGA), a digital signal processor (Digital Signal Processor, DSP), and an embedded devices, etc.

In at least one embodiment, the electronic device may be any electronic product capable of man-machine interaction with a user. For example, a personal computer, a tablet computer, a smart phone, a personal digital assistant (Personal Digital Assistant, PDA), a game console, an interactive Internet TV (Internet Protocol Television, IPTV), smart wearable devices, etc.

In at least one embodiment, the electronic device may also include a network device and/or a user device. The network device includes, but is not limited to, a single network server, a server group that includes several network servers, or a cloud that includes the large number of hosts or network servers based on cloud computing (cloud computing).

In at least one embodiment, the electronic device can also be an on-board device built in the vehicle or an electronic device that communicates with the vehicle.

In at least one embodiment, the network between the electronic device and a sever (e.g., a cloud server) includes but is not limited to the Internet, a wide area network, a metropolitan area network, a local area network, a virtual private network (VPN) and the like.

FIG. 1 illustrates a flowchart of an embodiment of a method for testing a driving assistance algorithm. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S11.

In block S11, the electronic device obtains a driving assistance algorithm of a vehicle to be tested and at least one specification parameter.

In at least one embodiment of the present disclosure, the driving assistance algorithm to be tested can be an algorithm of an Advanced Driver Assistance System (ADAS) that needs to be verified. The electronic device can collect data from various sensors installed on the vehicle to be tested by the driving assistance algorithm in order to pre-judge possible and potential dangers for a driver of the vehicle. The electronic device can also combine the collected data with a map to plan a safe driving trajectory for the driver to ensure driving safety. In practice, usually multiple vehicles of the same brand will use the same driving assistance algorithm. For example, the driving assistance algorithm to be tested may be a fully automatic driving (Full Self-Drive, FSD) algorithm.

In at least one embodiment of the present disclosure, the specification parameters are related to the vehicle, and the specification parameters includes, but are not limited to, a size of the vehicle, an image size corresponding to a photographing device in the vehicle, a steering ratio between a steering wheel and a tire. The steering ratio is relevant to a proportional relationship between two angles, and the two angles include a steering wheel rotation angle and a tire rotation angle of the vehicle.

In at least one embodiment of the present disclosure, the electronic device obtains the driving assistance algorithm and the multiple specification parameters from a local database. Or the electronic device obtains the specification parameters of the vehicle according to a model of the vehicle from a cloud server, which is connected to the electronic device through the network. The cloud server can pre-store the specification parameters of different models of different brands of vehicles.

In block S12, the electronic device models a virtual scene on a simulator according to multiple preset parameters and generates initial data according to the virtual scene.

In at least one embodiment of the present disclosure, the preset parameters may include parameters of a real object, and the real object refers to any object in the real world. For example, the real objects may be pedestrians, vehicles, trees, buildings and obstacles. The preset parameters include a position of the real object, a size of the real object, a pose of the real object, a speed of the real object and so on.

In at least one embodiment of the present disclosure, the simulator can simulate vehicle driving. The simulator includes, but is not limited to, a Carla simulator, an Unreal Engine simulator, and a LGSVL simulator.

In at least one embodiment of the present disclosure, the initial data is related to the virtual scene, and the initial data includes an initial image corresponding to the virtual scene, a size of the virtual object in the virtual scene, and a position of the virtual object.

In at least one embodiment of the present disclosure, the preset parameters include device parameters and multiple object parameters. The electronic device simulates a virtual photographing device in the simulator according to the device parameters and simulates a virtual object corresponding to each object parameter in the simulator according to each object parameter. Then the electronic device determines the scene formed by the multiple virtual objects as the virtual scene and controls the virtual photographing device to shoot the virtual scene to obtain at least one initial image.

The multiple virtual objects include virtual pedestrians, virtual roads, virtual vehicles, and virtual lane lines and so on.

In one embodiment, when any object parameter includes a moving speed, it indicates that the virtual object corresponding to any object parameter in the virtual scene is a dynamic object, and the virtual scene is a dynamic virtual scene. Therefore, the at least one initial image may include multiple continuous images corresponding to the dynamic virtual scene.

In one embodiment, since the object parameters include comprehensive object information such as a size of the object, a pose of the object, and a speed of the object. The electronic device models the virtual scene through the multiple object parameters, which can make the multiple virtual objects more accurate.

In other embodiments of the present disclosure, the simulator provides a simulation page. When a simulation database of the simulator includes multiple pre-built virtual objects, the electronic device directly calls a corresponding virtual object from the simulation database according to a selection instruction inputting by a user through the simulation page, and determines a scene formed by the called virtual object as the virtual scene. The virtual object includes, but is not limited to, a virtual photographing device, a virtual vehicle, a virtual pedestrian, a virtual road, a virtual lane line, a virtual tree, a virtual street lamp and the like.

For example, when the simulation database of the Carla simulator includes pre-built virtual objects such as the virtual vehicle, the virtual road, and virtual photographing device, the electronic device can directly invoke a corresponding model from the simulation database of the Carla simulator to generate the virtual scene.

In at least one embodiment, when the simulation database of the simulator includes a pre-built virtual object, the modeling of the virtual scene can be quickly completed by directly calling the virtual object corresponding to the selection instruction.

In block S13, the electronic device obtains target data corresponding to the driving assistance algorithm to be tested by converting the initial data according to a preset sensor conversion algorithm and the at least one specification parameter.

In at least one embodiment of the present disclosure, the preset sensor conversion algorithm includes a data conversion relationship between the virtual sensor of the simulator and the real sensor of the vehicle. As the electronic device calculates the initial vehicle control instruction corresponding to the virtual vehicle accurately, the driving assistance algorithm needs to be tested with a format of the target data that corresponds to the format of the real sensor, so the initial data needs to be converted.

For example, the real sensor may be a photographing device and a radar in the vehicle, and the photographing device may be a camera of the vehicle. The virtual sensor is a sensor corresponding to the real sensor of the simulator.

For example, when the real sensor is the photographing device, the virtual sensor is the virtual photographing device. The data of the real sensor includes a target image size corresponding to the photographing device, and the data of the virtual photographing device includes the initial image size of an initial image generated after the virtual photographing device shoots the virtual scene.

In at least one embodiment of the present disclosure, when the initial data is the initial image, and the target data is the target image, the electronic device obtains the target image by performs size conversion on the initial image according to the sensor conversion algorithm and the size of the target image.

Specifically, the electronic device obtains the target image by converting the size of the initial image into the size of the target image through the sensor conversion algorithm.

In one embodiment, in order to accurately calculate the initial vehicle control command of the vehicle, the electronic device needs to convert a format of the initial data into a format of the target data corresponding to the real sensor. Then, the electronic device can ensure the accuracy of the data input into the driving assistance algorithm to be tested by converting the initial data into the target data through the sensor conversion algorithm.

In block S14, the electronic device generates a target vehicle control instruction corresponding to the driving assistance algorithm to be tested of the simulator according to the driving assistance algorithm to be tested, the target data, a vehicle control conversion algorithm, and the at least one specification parameter.

In at least one embodiment of the present disclosure, the vehicle control conversion algorithm includes an instruction conversion relationship between the vehicle control instruction calculated by the driving assistance algorithm to be tested and the execution instruction of the simulator. When there are multiple driving assistance algorithms to be tested, the vehicle control conversion algorithm includes an instruction conversion relationship between each driving assistance algorithm to be tested and the execution instruction of the simulator. The target vehicle control instruction refers to an instruction generated after converting an initial vehicle control instruction using the vehicle control conversion algorithm, and the target vehicle control instruction is an instruction for controlling the virtual vehicle in the simulator. The initial vehicle control instruction includes an initial acceleration of the virtual vehicle, an initial speed of the virtual vehicle, and a steering wheel rotation angle of the virtual vehicle, etc., and the target vehicle control instruction includes a throttle value and a tire rotation angle of the virtual vehicle, etc.

For the detailed process of generating the target vehicle control instruction, refer to the process shown in FIG. 2. FIG. 2 is a flowchart of a method of generating a target vehicle control instruction provided in an embodiment of the disclosure of the present disclosure.

In block S141, the electronic device calculates a driving trajectory of the vehicle according to the driving assistance algorithm to be tested and the target data.

The electronic device extracts potential features from the target data by using the driving assistance algorithm to be tested and obtains the target object by identifying the potential features, and then the electronic device identifies passable spatial information according to the target object and generates the driving trajectory according to the continuous spatial information.

The target object may include a virtual road, a virtual lane line, a virtual traffic light, a virtual obstacle, and a virtual moving object and so on. The virtual moving object may be a virtual pedestrian on the virtual road. The electronic device may extract the potential features by using a sparse extraction method, identify the potential features by using a segmentation algorithm, obtain the target data, and mark target object in the target data. The segmentation algorithm can be set by a user, which is not limited of the present disclosure. For example, the segmentation algorithm may be a RegNet algorithm.

In one embodiment, the continuous spatial information includes a plurality of continuous spatial positions, and the electronic device connects the continuous spatial information to obtain the driving trajectory.

In block S142, the electronic device generates an initial vehicle control instruction corresponding to the driving trajectory.

In one embodiment, the vehicle includes a vehicle control module, and the vehicle control module includes a proportional-integral-derivative (Proportional-Integral-Derivative, PID) controller, a Kalman filter, and a model predictive (Model Predict Control, MPC) controller and so on.

In one embodiment, the electronic device generates the initial vehicle control instruction based on the driving trajectory by using the proportional-integral-derivative controller, the Kalman filter and the model predictive controller.

In one embodiment, when the electronic device recognizes the virtual pedestrian through the driving assistance algorithm to be tested, the corresponding initial braking instruction can be calculated through the driving assistance algorithm to avoid a collision between the virtual vehicle and the virtual pedestrian. When the electronic device identifies the virtual pedestrian, the initial vehicle control instruction includes the initial braking instruction. When the electronic device does not recognize the virtual pedestrian, the initial vehicle control instruction does not include the initial braking instruction. The initial braking instruction includes a reduced initial speed and an initial acceleration, etc.

In block S143, the electronic device obtains a target vehicle control instruction corresponding to the driving assistance algorithm to be tested of the simulator by converting the initial vehicle control instruction according to the vehicle control conversion algorithm and the specification parameters.

In one embodiment, the electronic device obtains a preset throttle calibration table, and calculates the throttle value according to the throttle calibration table and the initial acceleration, and then the electronic device obtains the steering ratio corresponding to the vehicle from the specification parameters and calculates the tire rotation angle according to the steering wheel rotation angle and the steering ratio.

In at least one embodiment, a range of the throttle value is generally [0, 1], and the throttle calibration table includes multiple preset throttle values corresponding to the virtual vehicle, a vehicle speed, and a vehicle acceleration corresponding to each preset throttle value. The electronic device searches an acceleration the same as the initial acceleration from the throttle calibration table and determines a preset throttle value corresponding to the searched acceleration as the throttle value corresponding to the virtual vehicle.

The throttle calibration table is related to the simulator, and the throttle calibration table needs to be obtained by testing the virtual vehicle in the simulator according to each preset throttle value. For example, when the initial acceleration is 5 m/s2, and the preset throttle value corresponding to the initial acceleration 5 m/s2 in the throttle calibration table of the simulator is 0.7, then the electronic device sets the throttle value as 0.7. For example, when the steering wheel rotation angle of the vehicle is 10 degrees and the tire rotation angle of the vehicle is 1 degree, the steering ratio is 1/10.

In one embodiment, as the virtual vehicle is in the virtual scene of the simulator, and there is a difference between the execution instruction of the simulator and the initial vehicle control instruction calculated by the driving assistance algorithm, the electronic device converts the initial vehicle control instruction into the target vehicle control instruction to control the vehicle. So that the virtual vehicle can achieve the vehicle control effect corresponding to the initial vehicle control instruction.

Specifically, the electronic device determines a product of the steering wheel rotation angle and the steering ratio as the tire rotation angle.

For example, when the steering wheel rotation angle is 20 degrees, and the steering ratio is 1/10, the tire rotation angle is equal to 20*1/10, which is 2.

In one embodiment, when the initial vehicle control instruction includes the initial braking instruction, the electronic device can convert the initial vehicle control instruction into a target braking instruction corresponding to the simulator through the vehicle control conversion algorithm.

In the block S15, the electronic device scores the driving assistance algorithm to be tested by executing the target vehicle control instruction in the virtual scene of the simulator.

In at least one embodiment of the present disclosure, the score can be used to evaluate the performance of the driving assistance algorithm to be tested.

In at least one embodiment of the present disclosure, the electronic device executes the target vehicle control instruction in the virtual scene through the simulator, obtains a vehicle status corresponding to the virtual vehicle, and scores the vehicle status to obtain a score of the driving assistance algorithm to be tested.

In at least one embodiment of the present disclosure, the electronic device controls the virtual vehicle to start driving by executing the target vehicle control instruction. The vehicle status includes a braking status of the virtual vehicle and a collision situation between the vehicle and the virtual pedestrian. The braking status includes a successful braking of the virtual vehicle, an unsuccessful braking of the virtual vehicle, and a non-braking of the virtual vehicle. The collision situation includes that the virtual vehicle does not collide with the virtual pedestrian and that the virtual vehicle collides with the virtual pedestrian.

In at least one embodiment, the electronic device determines a first preset score as the score of the driving assistance algorithm to be tested, when the braking status is that the virtual vehicle brakes successfully, and the collision situation is that the virtual vehicle does not collide with the virtual pedestrian. The electronic device determines a second preset score as the score of the driving assistance algorithm to be tested, when the braking status is a state of unsuccessful braking of the virtual vehicle, and the collision situation is that the virtual vehicle collides with the virtual pedestrian. The electronic device determines a third preset score as the score of the driving assistance algorithm to be tested, when the braking status is a state of non-braking of the virtual vehicle, and the collision situation is that the virtual vehicle collides with the virtual pedestrian.

In one embodiment, when the target vehicle control instruction includes the target braking instruction, the electronic device controls the virtual vehicle to brake according to the target braking instruction.

In one embodiment, when the braking status is that the virtual vehicle brakes successfully, and the collision situation is that the virtual vehicle does not collide with the virtual pedestrian, it means that the driving assistance algorithm to be tested has detected all the virtual pedestrian and calculate an effective initial vehicle control instruction, so the performance of the driving assistance algorithm to be tested is relatively good, and the first preset score should be relatively high. In one embodiment, when the braking status is that the virtual vehicle does not brake successfully, and the collision situation is that the virtual vehicle collides with the virtual pedestrian, it indicates that the driving assistance algorithm to be tested has detected the virtual pedestrian. However, an effective initial vehicle control instruction has not been calculated by the driving assistance algorithm to be tested, so that the virtual vehicle collides with the virtual pedestrian, so the performance of the driving assistance algorithm to be tested is relatively poor, and the second preset score is lower than the first preset score.

In one embodiment, when the braking status is the state of non-braking of the virtual vehicle, and the collision situation is that the virtual vehicle collides with the virtual pedestrian, it indicates that the driving assistance algorithm to be tested has not detected the virtual pedestrian and does not calculate an effective initial vehicle control instruction, so that the virtual vehicle does not collide with the virtual pedestrian, so the performance of the driving assistance algorithm to be tested is not good, and the third preset score is smaller than the second preset score. The relationship between the first preset score, the second preset score and the third preset score can be expressed as: the first preset score>the second preset score>the third preset score.

For example, the first preset score may be 10, the second preset score may be 5, and the third preset score may be 0.

In other embodiments of the present disclosure, when the braking status is that the virtual vehicle brakes successfully, the vehicle status may further include a braking distance between the virtual vehicle and the virtual pedestrian when the virtual vehicle brakes successfully, the electronic device may set a preset score corresponding the braking distance from a first preset score table as the score of the driving assistance algorithm to be tested. The first preset score table includes at least one preset score and a preset vehicle distance corresponding to each preset score. When the braking status is that the virtual vehicle fails to brake, the vehicle status may also include a target speed a target acceleration of the virtual vehicle when the virtual vehicle collides with the virtual pedestrian. The electronic device may search a second preset score table for a preset score corresponding to the target speed and the target acceleration as the score of the driving assistance algorithm to be tested. The second preset score table includes at least one preset score and a preset speed and a preset acceleration corresponding to each preset score. When the braking status is that the virtual vehicle brakes successfully, the electronic device may search the first preset score table for a preset vehicle distance that is the same as the braking distance and set the preset score corresponding to the vehicle distance as the score of the driving assistance algorithm to be tested. When the braking status is that the virtual vehicle has not braked successfully, the electronic device can search the second preset score table for a preset speed that is the same as the target speed and a preset acceleration that is the same as the target acceleration and set a preset score corresponding to the same preset speed and preset acceleration as a score of the driving assistance algorithm to be tested.

In one embodiment, in order to ensure the safety and effectiveness of the driving assistance algorithm to be tested, the electronic device sets the preset score, the preset vehicle distance, the preset speed and the preset acceleration may be based on traffic safety rules.

In one embodiment, the electronic device may also construct a log recording (log) module, and the log recording module is used to store the vehicle status, the first preset score table, and the second preset score table and scores of the driving assistance algorithm to be tested.

In one embodiment of the present disclosure, the score of the driving assistance algorithm to be tested can be used to evaluate the performance of the driving assistance algorithm to be tested, and when the score of the driving assistance algorithm to be tested is lower than a preset threshold, the electronic device generates a prompt information to prompt the user to improve the driving assistance algorithm to be tested. The preset threshold can be set by the electronic device, which is not limited in this disclosure. For example, the preset threshold may be 0 or 1 or the like.

In at least one embodiment, the present disclosure discloses the electronic device performs modeling on a simulator based on the received parameters and simulates a virtual vehicle in the virtual scene corresponding to the vehicle and converts the initial data of the virtual scene by using a sensor conversion algorithm. Then, the initial data can be converted into data that can be recognized by the driving assistance algorithm to be tested. The electronic device analyzes the target data by the driving assistance algorithm to be tested and obtains a driving trajectory of the vehicle in the virtual scene and an initial vehicle control instruction for controlling the virtual vehicle to travel the vehicle in the virtual. As there is a difference between the execution instruction of the simulator and the initial vehicle control instruction calculated by the driving assistance algorithm, the electronic device converts the initial vehicle control instruction into the target vehicle control instruction to control the vehicle. The instruction conversion relationship between the vehicle control instruction and the execution instruction of the emulator ensures that the virtual vehicle can achieve the vehicle control effect corresponding to the initial vehicle control instruction, thereby improving the verification accuracy of the driving assistance algorithm.

FIG. 3 is a schematic structural diagram of an electronic device provided by an embodiment of the present disclosure. In at least one embodiment, the electronic device 1 includes a storage device 12, at least one processor 13, and a computer program that is stored in the storage device 12 and can be executed on the processor 13, such as a test program for a driving assistance algorithm. Those skilled in the art should understand that the structure of the electronic device shown in FIG. 1 does not constitute a limitation of the embodiment of the present disclosure, more or less other hardware or software, or a different arrangement of components. For example, the electronic device 1 may also include an input and output device, a network access device, a bus, and the like.

In some embodiments, the storage device 12 is used to store program codes and various data. The storage device 12 includes a read-only memory (Read-Only Memory, ROM), a programmable read-only memory (Programmable Read-Only Memory, PROM), an erasable programmable read-only memory (Erasable Programmable Read-Only Memory, EPROM), One-time Programmable Read-Only Memory (OTPROM), Electronically Erasable Programmable Read- Only Memory (EEPROM), Compact Disc Read-Only Memory (EEPROM), Only Memory, CD-ROM) or other optical disk storage, magnetic disk storage, tape storage, or any other computer-readable storage medium that can be used to carry or store data.

In some embodiments, the at least one processor 13 may be include an integrated circuit, for example, may be include a single packaged integrated circuit, or may be include multiple integrated circuits with the same function or different functions packaged, including one or more central processing units (Central Processing unit, CPU), microprocessors, digital processing chips, graphics processors, and various control chips. The at least one processor 13 is the control core (Control Unit) of the electronic device 1, and uses various interfaces and lines to connect various components of the entire electronic device 1, by running or executing programs stored in the storage device 12 or module, and call the data stored in the storage device 12 to execute various functions of the electronic device 1 and process data, for example, to execute the function of driving assistance algorithm testing method shown in FIG. 1.

In at least one embodiment, the at least one processor 13 obtains an operating system of the electronic device 1 and various installed application programs. The at least one processor 13 obtains the application program to implement the blocks in the embodiments of the above-mentioned driving assistance algorithm testing method, as shown in FIG. 1 and FIG. 2.

In at least one embodiment, when the integrated modules/units of the electronic device 1 are realized in the form of software function units and sold or used as independent products, they can be stored in a computer-readable storage medium. The present disclosure realizes all or part of the processes in the methods of the above embodiments and can also be completed by instructing related hardware through computer programs, and the computer programs can be stored in a computer-readable storage medium. When the computer program is acquired by the processor, it can realize the blocks of the above-mentioned various method embodiments.

Referring to FIG. 1, the storage device 12 of the electronic device 1 stores a plurality of instructions to implement the driving assistance algorithm testing method, and the processor 13 obtains a driving assistance algorithm to be tested of a vehicle and multiple specification parameters and models a virtual scene on a simulator according to the preset parameters and generates an initial image according to the virtual scene. The processor 13 obtains a target image corresponding to the driving assistance algorithm by converting the initial image according to a preset sensor conversion algorithm and the specification parameters, and generates a target vehicle control instruction according to the driving assistance algorithm, the target image, a vehicle control conversion algorithm, and the specification parameters, and scores the driving assistance algorithm by executing the target vehicle control instruction in the virtual scene of the simulator Specifically, for the specific implementation method of the above instructions by the processor 13, reference may be made to the description of relevant blocks in the embodiment corresponding to FIG. 1, and details are not repeated here.

It is understood that the division of modules described above is a logical functional division, and there can be another division in actual implementation. In addition, each functional module in each embodiment of the present application may be integrated in the same processing unit, or each module may physically exist separately, or two or more modules may be integrated in the same unit. The above integrated modules can be implemented either in the form of hardware or in the form of hardware plus software functional modules. The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A driving assistance algorithm testing method using an electronic device, the method comprising:

obtaining a driving assistance algorithm to be tested of a vehicle and at least one specification parameter;

modeling a virtual scene on a simulator of the electronic device according to a plurality of preset parameters and generating an initial image according to the virtual scene;

obtaining a target image corresponding to the driving assistance algorithm to be tested by converting the initial image according to a preset sensor conversion algorithm and the at least one specification parameter, comprising: obtaining the target image by performing a size transformation on the initial image according to the preset sensor conversion algorithm and a size of the target image;

generating a target vehicle control instruction according to the driving assistance algorithm to be tested, the target image, a vehicle control conversion algorithm, and the at least one specification parameter; and scoring the driving assistance algorithm to be tested by executing the target vehicle control instruction in the virtual scene of the simulator.

2. The driving assistance algorithm testing method according to claim 1, wherein modeling the virtual scene on the simulator of the electronic device according to the plurality of preset parameters and generating the initial image from the virtual scene comprises:

simulating a virtual photographing device in the simulator according to a plurality of device parameters of the plurality of preset parameters;

simulating each virtual object corresponding to each of a plurality of object parameters of the plurality of preset parameters in the simulator;

determining a scene that comprises a plurality of virtual objects as the virtual scene; and obtaining the initial image by controlling the virtual photographing device to shoot the virtual scene.

3. The driving assistance algorithm testing method according to claim 1, wherein generating the target vehicle control instruction according to the driving assistance algorithm to be tested, the target image, the vehicle control conversion algorithm, and the at least one specification parameter comprises:

calculating a driving trajectory of the vehicle according to the driving assistance algorithm to be tested and the target image;

calculating an initial vehicle control instruction corresponding to the driving trajectory; and obtaining the target vehicle control instruction by converting the initial vehicle control instruction according to the vehicle control conversion algorithm and the at least one specification parameter.

4. The driving assistance algorithm testing method according to claim 3, wherein calculating the driving trajectory of the vehicle according to the driving assistance algorithm to be tested and the target image comprises:

extracting a plurality of potential features from the target image by using the driving assistance algorithm to be tested;

obtaining the target object by identifying the plurality of potential features;

identifying passable spatial information according to the target object; and generating the driving trajectory according to continuous passable spatial information.

5. The driving assistance algorithm testing method according to claim 4, wherein generating a target vehicle control instruction according to the driving assistance algorithm to be tested, the target image, the vehicle control conversion algorithm, and the at least one specification parameter comprises:

acquiring a preset throttle calibration table;

calculating a throttle value according to the throttle calibration table and an initial acceleration of the initial vehicle control instruction;

obtaining a steering ratio corresponding to the vehicle from the at least one specification parameter; and calculating a tire rotation angle according to a steering wheel angle of the initial vehicle control instruction and the steering ratio.

6. The driving assistance algorithm testing method according to claim 1, wherein scoring the driving assistance algorithm to be tested by executing the target vehicle control instruction in the virtual scene of the simulator comprises:

obtaining at least one vehicle status corresponding to the virtual vehicle by executing the target vehicle control instruction in the virtual scene through the simulator; and scoring the at least one vehicle status to obtain a score of the driving assistance algorithm to be tested.

7. An electronic device comprising:

a storage device;

at least one processor; and the storage device storing one or more programs, which when executed by the at least one processor, cause the at least one processor to:

obtain a driving assistance algorithm to be tested of a vehicle and at least one specification parameter;

model a virtual scene on a simulator of the electronic device according to a plurality of preset parameters and generate an initial image according to the virtual scene;

obtain a target image corresponding to the driving assistance algorithm to be tested by converting the initial image according to a preset sensor conversion algorithm and the at least one specification parameter, comprising: obtain the target image by performing a size transformation on the initial image according to the preset sensor conversion algorithm and a size of the target image;

generate a target vehicle control instruction according to the driving assistance algorithm to be tested, the target image, a vehicle control conversion algorithm, and the at least one specification parameter; and score the driving assistance algorithm to be tested by executing the target vehicle control instruction in the virtual scene of the simulator.

8. The electronic device according to claim 7, wherein the at least one processor models the virtual scene on the simulator of the electronic device according to the plurality of preset parameters and generating the initial image from the virtual scene by:

simulating a virtual photographing device in the simulator according to a plurality of device parameters of the plurality of preset parameters;

simulating each virtual object corresponding to each of a plurality of object parameters of the plurality of preset parameters in the simulator;

determining a scene that comprises a plurality of virtual objects as the virtual scene; and obtaining the initial image by controlling the virtual photographing device to shoot the virtual scene.

9. The electronic device according to claim 7, wherein the at least one processor generates the target vehicle control instruction according to the driving assistance algorithm to be tested, the target image, the vehicle control conversion algorithm, and the at least one specification parameter by:

calculating a driving trajectory of the vehicle according to the driving assistance algorithm to be tested and the target image;

calculating an initial vehicle control instruction corresponding to the driving trajectory; and obtaining the target vehicle control instruction by converting the initial vehicle control instruction according to the vehicle control conversion algorithm and the at least one specification parameter.

10. The electronic device according to claim 9, wherein the at least one processor calculates the driving trajectory of the vehicle according to the driving assistance algorithm to be tested and the target image by:

extracting a plurality of potential features from the target image by using the driving assistance algorithm to be tested;

obtaining the target object by identifying the plurality of potential features;

identifying passable spatial information according to the target object; and generating the driving trajectory according to continuous passable spatial information.

11. The electronic device according to claim 10, wherein the at least one processor generates a target vehicle control instruction according to the driving assistance algorithm to be tested, the target image, the vehicle control conversion algorithm, and the at least one specification parameter by:

acquiring a preset throttle calibration table;

calculating a throttle value according to the throttle calibration table and an initial acceleration of the initial vehicle control instruction;

obtaining a steering ratio corresponding to the vehicle from the at least one specification parameter; and calculating a tire rotation angle according to a steering wheel angle of the initial vehicle control instruction and the steering ratio.

12. The electronic device according to claim 7, wherein the at least one processor scores the driving assistance algorithm to be tested by executing the target vehicle control instruction in the virtual scene of the simulator to:

obtaining at least one vehicle status corresponding to the virtual vehicle by executing the target vehicle control instruction in the virtual scene through the simulator; and scoring the at least one vehicle status to obtain a score of the driving assistance algorithm to be tested.

13. A non-transitory storage medium having instructions stored thereon, when the instructions are executed by a processor of an electronic device, the processor is caused to perform a driving assistance algorithm testing method, wherein the method comprises:

obtaining a driving assistance algorithm to be tested of a vehicle and at least one specification parameter;

modeling a virtual scene on a simulator of the electronic device according to a plurality of preset parameters and generating an initial image according to the virtual scene;

obtaining a target image corresponding to the driving assistance algorithm to be tested by converting the initial image according to a preset sensor conversion algorithm and the at least one specification parameter, comprises: obtaining the target image by performing a size transformation on the initial image according to the preset sensor conversion algorithm and a size of the target image;

generating a target vehicle control instruction according to the driving assistance algorithm to be tested, the target image, a vehicle control conversion algorithm, and the at least one specification parameter; and scoring the driving assistance algorithm to be tested by executing the target vehicle control instruction in the virtual scene of the simulator.

14. The non-transitory storage medium according to claim 13, wherein modeling the virtual scene on the simulator of the electronic device according to the plurality of preset parameters and generating the initial image from the virtual scene comprises:

simulating a virtual photographing device in the simulator according to a plurality of device parameters of the plurality of preset parameters;

simulating each virtual object corresponding to each of a plurality of object parameters of the plurality of preset parameters in the simulator;

determining a scene that comprises a plurality of virtual objects as the virtual scene; and obtaining the initial image by controlling the virtual photographing device to shoot the virtual scene.

15. The non-transitory storage medium according to claim 13, wherein generating the target vehicle control instruction according to the driving assistance algorithm to be tested, the target image, the vehicle control conversion algorithm, and the at least one specification parameter comprises:

calculating a driving trajectory of the vehicle according to the driving assistance algorithm to be tested and the target image;

calculating an initial vehicle control instruction corresponding to the driving trajectory; and obtaining the target vehicle control instruction by converting the initial vehicle control instruction according to the vehicle control conversion algorithm and the at least one specification parameter.

16. The non-transitory storage medium according to claim 14, wherein calculating the driving trajectory of the vehicle according to the driving assistance algorithm to be tested and the target image comprises:

extracting a plurality of potential features from the target image by using the driving assistance algorithm to be tested;

obtaining the target object by identifying the plurality of potential features;

identifying passable spatial information according to the target object; and generating the driving trajectory according to continuous passable spatial information.

17. The non-transitory storage medium according to claim 16, wherein generating a target vehicle control instruction according to the driving assistance algorithm to be tested, the target image, the vehicle control conversion algorithm, and the at least one specification parameter comprises:

acquiring a preset throttle calibration table;

calculating a throttle value according to the throttle calibration table and an initial acceleration of the initial vehicle control instruction;

obtaining a steering ratio corresponding to the vehicle from the at least one specification parameter; and calculating a tire rotation angle according to a steering wheel angle of the initial vehicle control instruction and the steering ratio.

* * * * *